(12) United States Patent
Qahtani et al.

(10) Patent No.: US 12,305,129 B2
(45) Date of Patent: May 20, 2025

(54) CONTROLLING ENERGY GENERATION AND USE BY ADJUSTMENT OF DISTILLATION COLUMNS

(71) Applicant: SAUDI ARABIAN OIL COMPANY, Dhahran (SA)

(72) Inventors: Mohammed A. Qahtani, Dhahran (SA); Mohammed Y. Alyousif, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 112 days.

(21) Appl. No.: 18/192,163

(22) Filed: Mar. 29, 2023

(65) Prior Publication Data

US 2024/0327722 A1 Oct. 3, 2024

(51) Int. Cl.
*B01D 3/32* (2006.01)
*B01D 3/00* (2006.01)
*B01D 3/42* (2006.01)
*C10G 7/12* (2006.01)
*F25J 3/02* (2006.01)

(52) U.S. Cl.
CPC ............ *C10G 7/12* (2013.01); *B01D 3/007* (2013.01); *B01D 3/322* (2013.01); *B01D 3/42* (2013.01); *F25J 3/0209* (2013.01); *C10G 2300/1025* (2013.01)

(58) Field of Classification Search
CPC .......... B01D 3/007; B01D 3/322; B01D 3/42; C10G 7/12; F25J 3/0209
See application file for complete search history.

(56) References Cited

U.S. PATENT DOCUMENTS

| | | | | |
|---|---|---|---|---|
| 3,243,359 A | * | 3/1966 | Schmidt | F22B 1/1892 203/DIG. 20 |
| 3,434,934 A | * | 3/1969 | Washer | B01D 3/425 203/1 |
| 4,303,478 A | * | 12/1981 | Field | B01D 3/14 203/26 |

(Continued)

OTHER PUBLICATIONS

Rademaker, O. and J.E. Rijnsdorp, "Dynamics and Control of Continuous Distillation Columns," Paper presented at the 5th World Petroleum Congress, New York, USA, May 1959, pp. 59-79, 21 pages.

*Primary Examiner* — Jonathan Miller
(74) *Attorney, Agent, or Firm* — Osha Bergman Watanabe & Burton LLP (57) ABSTRACT

A process for distillation includes distilling a hydrocarbon feed to produce a top hydrocarbon fraction and a bottom hydrocarbon fraction in a column within a distillation unit comprising the column, a reboiler, and a control system. The process may include feeding steam from a cogeneration unit to the reboiler and controlling power generated by the cogeneration unit with a power controller. A system includes a distillation unit with a column, a reboiler, and a control system, where the distillation unit is configured to distill a hydrocarbon feed to produce a top hydrocarbon fraction and a bottom hydrocarbon fraction. The system may also include a cogeneration unit configured to feed steam to the distillation unit. The control system may be configured to control a power generated by and maintain a steam demand from the cogeneration unit.

17 Claims, 3 Drawing Sheets

(56) References Cited

U.S. PATENT DOCUMENTS

| | | | | |
|---|---|---|---|---|
| 4,348,259 A | * | 9/1982 | Jensen | B01D 3/4255 |
| | | | | 700/270 |
| 4,377,443 A | * | 3/1983 | Tuck | B01D 3/4227 |
| | | | | 203/1 |
| 5,925,223 A | * | 7/1999 | Simpson | B01D 5/0081 |
| | | | | 202/160 |
| 7,073,337 B2 | * | 7/2006 | Mangin | C02F 1/16 |
| | | | | 60/783 |
| 8,065,890 B2 | * | 11/2011 | Mak | F02C 1/04 |
| | | | | 62/620 |
| 8,316,665 B2 | * | 11/2012 | Mak | F25J 3/0219 |
| | | | | 62/623 |
| 9,618,261 B2 | * | 4/2017 | Huntington | F01K 5/02 |
| 10,696,566 B2 | * | 6/2020 | Lange | F01D 15/10 |
| 11,692,772 B2 | * | 7/2023 | Lourenco | F25J 3/0233 |
| | | | | 62/621 |
| 11,766,625 B2 | * | 9/2023 | Pan | C10G 7/12 |
| | | | | 202/159 |
| 2008/0190135 A1 | * | 8/2008 | Mak | F02C 1/04 |
| | | | | 62/620 |
| 2008/0302650 A1 | * | 12/2008 | Bello | F25J 3/0209 |
| | | | | 203/25 |
| 2011/0048922 A1 | * | 3/2011 | Cretoiu | B01D 3/40 |
| | | | | 202/160 |
| 2023/0191278 A1 | * | 6/2023 | Pan | B01D 3/4233 |
| | | | | 202/159 |

* cited by examiner

CONTROLLING ENERGY GENERATION AND USE BY ADJUSTMENT OF DISTILLATION COLUMNS

BACKGROUND

Natural gas as extracted from the earth generally contains dissolved liquids termed natural gas liquids. Natural gas liquid (NGL) fractionation processes are chemical engineering processes used in petroleum refineries to transform natural gas into products, for example, dry natural gas, liquefied petroleum gas (LPG), gasoline, kerosene, jet fuel, diesel oils, fuel oils, and such products. NGL fractionation facilities are large industrial complexes that involve many different processing units and auxiliary facilities, for example, utility units, storage tanks, and such auxiliary facilities. Each facility can have its own unique arrangement and combination of refining processes determined, for example, by the refinery location, desired products, economic considerations, or such factors. Energy usage in an NGL fractionation facility can affect economic considerations, which can in turn make a natural gas liquids fractionation plant nonviable. Accordingly, there exists a need for controlling energy generation and use in NGL fractionation facilities.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a process for distillation. The process for distillation may include distilling a hydrocarbon feed to produce a top hydrocarbon fraction and a bottom hydrocarbon fraction in a column within a distillation unit comprising the column, a reboiler, and a control system. The process may also include feeding steam from a cogeneration unit to the reboiler at a steam demand maintained by the control system and controlling power generated by the cogeneration unit with a power controller within the control system.

In another aspect, embodiments disclosed herein relate to a system for distillation. The system for distillation may comprise a distillation unit comprising a column, a reboiler, and a control system, wherein the distillation unit is configured to distill a hydrocarbon feed to produce a top hydrocarbon fraction and a bottom hydrocarbon fraction. The system may also comprise a cogeneration unit configured to feed steam to the distillation unit where the control system may be configured to control a power generated by the cogeneration unit and to maintain a steam demand from the cogeneration unit.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Regarding the figures described herein, when using the term "down" the direction is toward or at the bottom of a respective figure, and "up" is toward or at the top of the respective figure. "Up" and "down" are oriented relative to a local vertical direction. However, in the oil and gas industry, one or more activities take place in a vertical, substantially vertical, deviated, substantially horizontal, or horizontal well. Therefore, one or more figures may represent an activity in deviated or horizontal wellbore configuration. "Uphole" may refer to objects, units, or processes that are positioned relatively closer to the surface entry in a wellbore than another. "Downhole" may refer to objects, units, or processes that are positioned relatively farther from the surface entry in a wellbore than another. True vertical depth is the vertical distance from a point in the well at a location of interest to a reference point on the surface.

Figure 1:
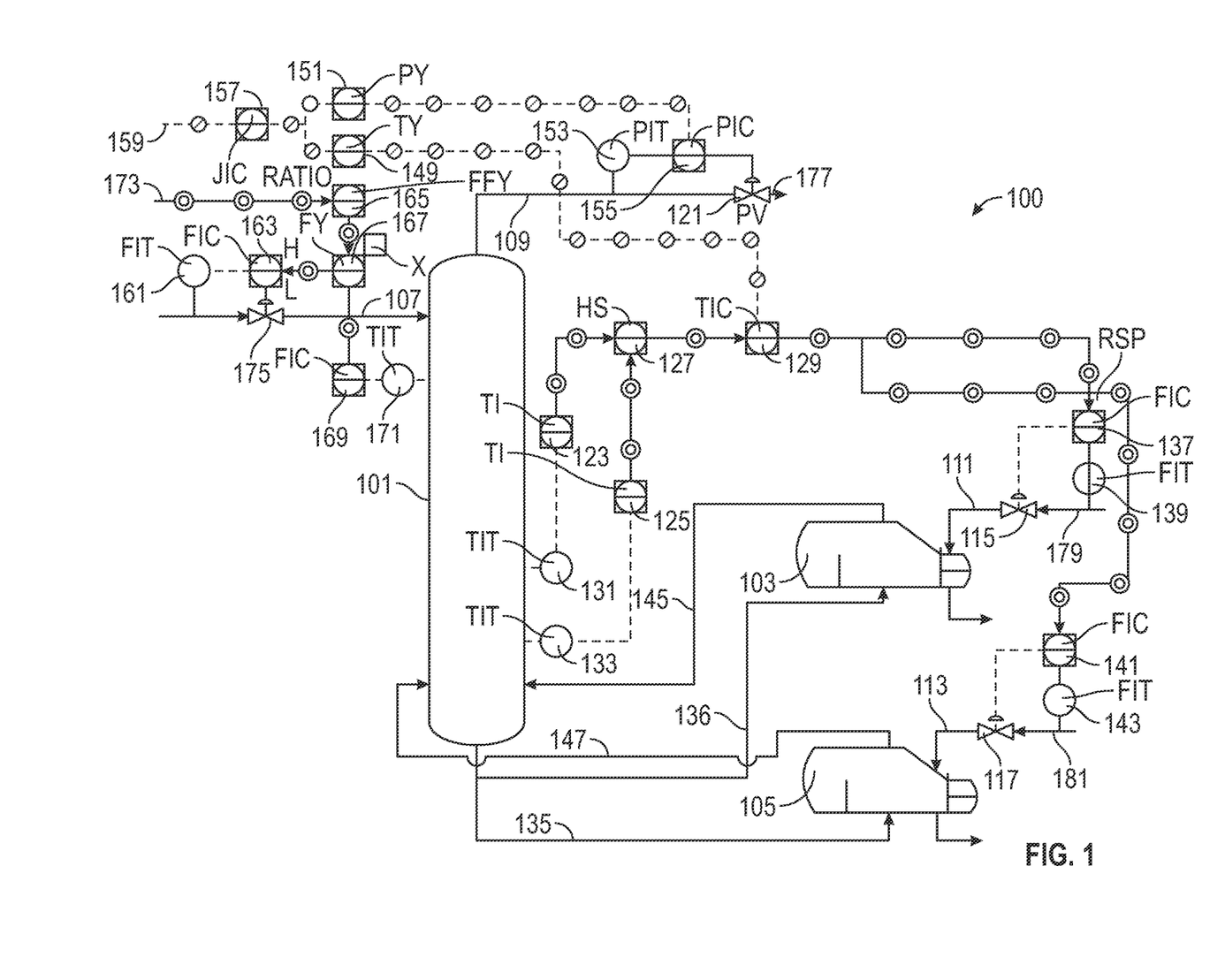
FIG. 1 shows a schematic diagram of a distillation column coupled with a cogeneration unit, in accordance with one or more embodiments.

FIG. 1 shows a distillation unit 100 that includes a distillation column 101, a first reboiler 103, and a second reboiler 105. A portion of the bottom products streamline 135 is fed to the first reboiler 103, and another portion of the bottom products streamline 136 is fed to the second reboiler 105. The first reboiler 103 and second reboiler 105 are each configured to heat the bottom of the distillation column 101. A feed is fed to the distillation column 101 through feed line 107. The feed is separated into at least two portions-a top fraction and a bottom fraction in the distillation column 101. The top fraction is withdrawn from the distillation column 101 via a top products streamline 109. First streamline 111 and second streamline 113 are configured to provide steam streams to the first reboiler 103 and second reboiler 105. A control system is configured to control the flow of the steam streams via first control valve 115 and second control valve 117. Steam may be fed to the first reboiler 103 through the line 179, and to the second reboiler 105 through the line 181. A first temperature transmitter 131, and a second temperature transmitter 133 are configured to measure the temperature of a portion of the bottom of the distillation column 101. A first temperature indicator 123 and a second temperature indicator 125 may be configured to control the temperature of the bottom of the distillation column 101. The feed may include a mixture of hydrocarbons. That is, the feed may be a hydrocarbon feed. When the feed includes a mixture of hydrocarbons, the top fraction is a top hydrocarbon fraction. When the feed includes a mixture of hydrocarbons, the bottom fraction is a bottom hydrocarbon fraction.

A hand switch 127 may be a part of the control system that may be configured to switch between the line of the first temperature transmitter 131 with the first temperature indicator 123, and the line of the second temperature transmitter 133 and the second temperature indicator 125 and pass the signal to a temperature controller 129. The temperature controller 129 may be part of the control system that may be configured to control the temperature. The temperature controller 129 may be configured to communicate with a first set of flow indicator controller 137, that may be part of the control system and flow indicator transmitter 139, and a second set of flow indicator controller 141, that may be part of the control system, and flow indicator transmitter 143. The first set of flow indicator controller 137 and flow indicator transmitter 139 may be configured to control the flow rate of steam stream through first streamline 111 to the first reboiler 103. The second set of flow indicator controller 141 and flow indicator transmitter 143 may be configured to control the flow rate of steam stream through second streamline 113 to the second reboiler 105. The bottom product streams may be recycled back to the cogeneration unit via lines 145 and 147 after heating in the first reboiler 103 and second reboiler 105.

A pressure control valve 121 may be positioned at the top products streamline 109 and configured to control the pressure of the distillation column 101. The top products may be sent to a condenser unit via the steam line 177. A pressure indicator transmitter 153 may be positioned at the top products streamline 109. The pressure indicator transmitter 153 may be a pressure sensor. A pressure controller 155 may be part of the control system/computer system and may be configured to command the pressure control valve 121 such that the flow rate of the products flowing through the top products streamline 109 is controlled, and thus the pressure of the distillation column 101 is controlled.

The control system may include a temperature relay/transducer 149 and a pressure relay/transducer 151 connected in series with a power controller 157. The power controller 157 may be configured to receive signals from one or more of the plurality of cogeneration units in the natural gas liquids fractionation facility to determine operational load of one or more of the plurality of cogeneration units. The temperature relay/transducer 149 and pressure relay/transducer 151 both may be configured to convert electrical signals to pneumatic signals. The pressure relay/transducer 151 may send an electric signal to the temperature relay/transducer 149 based on the pressure of the top products streamline 109. The temperature relay/transducer 149 may be in communication with the temperature controller 129 in order to control the flow rate of steam into the first reboiler 103 and second reboiler 105.

The power controller 157 may receive a signal 159 from a cogeneration unit. The signal may refer to the load of the cogeneration unit. Standard load measurement devices may be utilized for measuring the electricity load or the heat load of the cogeneration unit. Based on the load of the cogeneration unit, the power controller 157 may receive a signal to set a new set point and control the pressure and bottom temperature of the distillation column 101 as described above.

A flow control valve 175 may be positioned on the feed line 107 and may be configured to control the flow rate of the feed stream to the distillation column 101. A temperature indicator transmitter 171 may be configured to measure the temperature of the distillation column 101, and a temperature controller 169 (part of the control system) may be positioned in series with the temperature indicator transmitter 171 that may be configured to send a signal to the flow relay 167, or a current-to-air (I/P) transducer. A ratio may also be calculated via a FFY 165 (part of the control system) based on the flowline 173. The flow relay 167 may be configured to send a signal to the flow indicator controller 163 (part of the control system) that may be in communication with the flow control valve 175. A flow indicator transmitter 161 may be positioned on the feed line 107 that may be in communication with the flow indicator controller 163. Column 101 may be a distillation column which has its bottom temperature maintained by temperature controller 129 and overhead pressure maintained by pressure controller 155 to produce on spec products from top products streamline 109 and bottom products streamline 135. Flowline 173 may receive a signal from feed line 107 and FFY 165 may be calculated to adjust reflux flow to control temperature indicator transmitter 171.

In one or more embodiments, the control system may include or be a distributed control system ("DCS"), configured to manipulate the pressure of a NGL fractionation column, the bottom temperature of a NGL fractionation column, and a reflux ratio to maximize or minimize the heating duty of the reboiler in thermal communication with the cogeneration unit. Flowline 173 may receive a signal from feed line 107 and a ratio from FFY 165 may be calculated to adjust reflux flow to control top temperature through a reflex line. Reflux line is not included in FIG. 1

In one or more embodiments, streams are flowed within each plant in an NGL fractionation plant and between plants in the NGL fractionation plant. The streams can be flowed using one or more flow control systems implemented throughout the NGL fractionation plant. A flow control system can include one or more flow pumps to pump the streams, one or more flow pipes through which the streams are flowed and one or more valves to regulate the flow of streams through the pipes.

In one or more implementations, a flow control system can be operated manually. For example, an operator can set a flow rate for each pump and set valve open or close positions to regulate the flow of the streams through the pipes in the flow control system. Once the operator has set the flow rates and the valve open or close positions for all flow control systems distributed across the NGL fractionation plant, the flow control system can flow the streams within a plant or between plants under constant flow conditions, for example, constant volumetric rate or such flow conditions. To change the flow conditions, the operator can manually operate the flow control system, for example, by changing the pump flow rate or the valve open or close position.

In one or more embodiments, a flow control system can be operated automatically. For example, the flow control system can be connected to a computer system to operate the flow control system. The computer system can include a computer-readable medium storing instructions (such as flow control instructions and other instructions) executable by one or more processors to perform operations (such as flow control operations). An operator can set the flow rates and the valve open or close positions for all flow control systems distributed across the NGL fractionation plant using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor, or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

In one or more embodiments, the distillation unit 100 may be a part of a natural gas liquids fractionation facility that includes a deethanizer unit, a depropanizer unit, and a debutanizer unit. The distillation column 101 may be selected from any of these units. The deethanizer unit may be configured to produce C2 as an overhead product, and C3+ hydrocarbons as bottom products from a mixture of hydrocarbons entering the dethanizer unit. The dethanizer unit may comprise the first distillation column. The depropanizer unit, configured to produce C3 as an overhead product, and C4+ hydrocarbons as bottom products from a mixture of hydrocarbons entering the depropanizer unit, and the depropanizer unit may comprise the second distillation column. The debutanizer unit may be configured to produce C4 as an overhead product, and C5+ hydrocarbons as bottom products from a mixture of hydrocarbons entering the debutanizer unit. The debuanizer unit may comprise the third distillation column.

In one or more embodiments, a heating fluid circuit comprising a heating fluid such as steam may be thermally coupled to the plurality of cogeneration units in the natural gas liquids fractionation facility.

In one or more embodiments, the feed may comprise C1-C8 hydrocarbons. The feed may also include impurities including nitrogen, carbon dioxide, and hydrogen sulfide.

In one or more embodiments, the reboilers may be kettle-type, and configured to heat hydrocarbons via thermal contact with a high pressure-steam in a pressure range from 150 to 250 PSIG.

In one or more embodiments, the distillation unit 100 may further include a decolorizer, configured to produce color bodies from the hydrocarbon feed.

Figure 2:
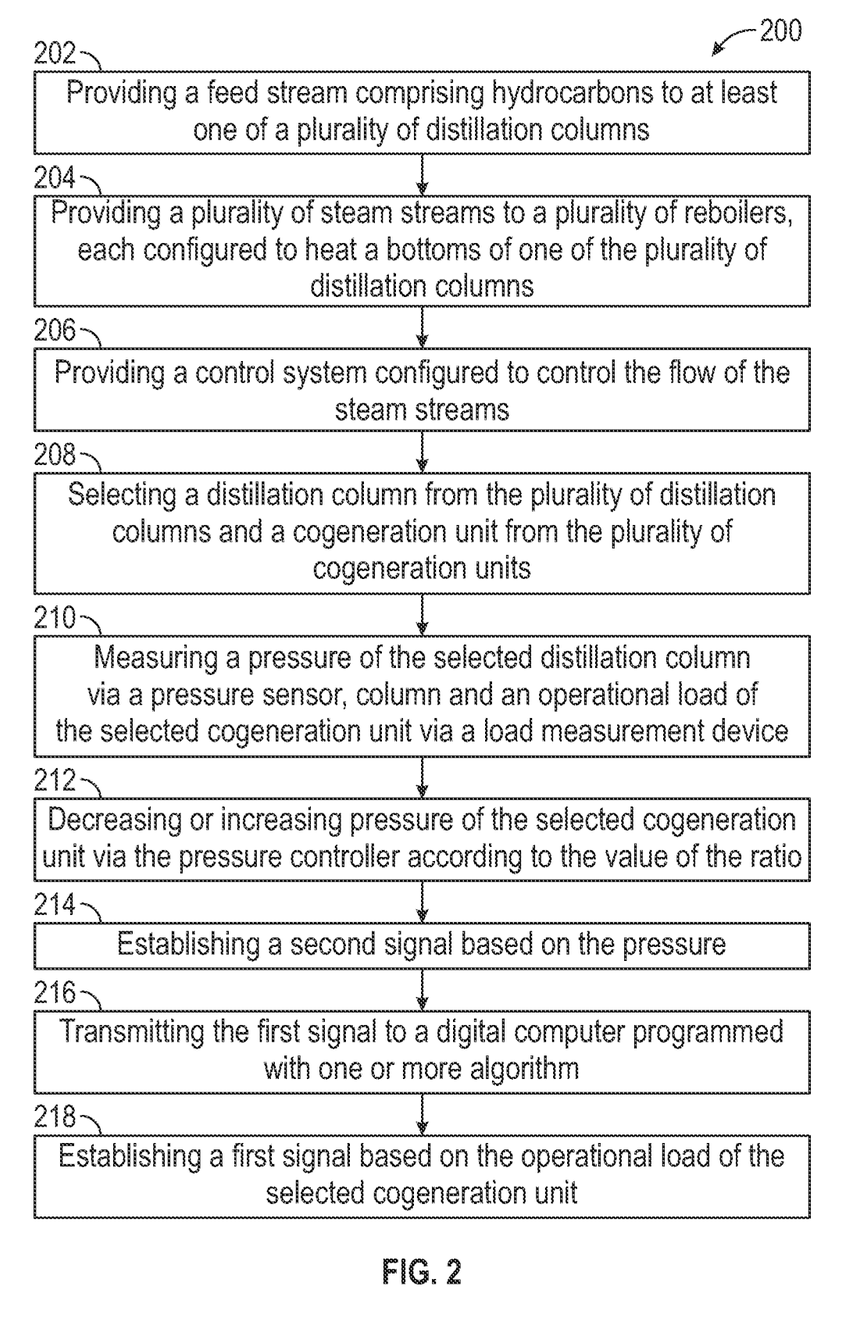
FIG. 2 shows process for distillation, in accordance with one or more embodiments.

FIG. 2 shows method steps 200 for controlling energy generation and utilization in a distillation column in accordance with one or more embodiments. The method may include step 202 for providing a feed stream comprising hydrocarbons to at least one of a plurality of distillation columns. In step 204, the method may include providing a plurality of steam streams from a plurality of cogeneration units to a plurality of reboilers, each configured to heat the bottom of one of the plurality of distillation columns. In step 206, the method may include providing a control system configured to control the flow of the steam streams. In step 208, the method may include selecting a distillation column from the plurality of distillation columns and a cogeneration unit from the plurality of cogeneration units. In step 210, the method may include measuring a pressure of the selected distillation column via a pressure sensor, column and an operational load of the selected cogeneration unit via a load measurement device. In step 212, the method may include establishing a first signal based on the operational load of the selected cogeneration unit. In step 214, the method may include transmitting the first signal to a digital computer programmed with one or more algorithms, wherein the first algorithm estimates an operational load and calculates a ratio between the operational load to a pre-set maximum allowable load. In step 216, the method may include establishing a second signal based on the pressure, wherein a control system is configured to receive the second signal and transmit a third signal to a pressure regulator. In step 218, the method may include decreasing or increasing the pressure of the selected cogeneration unit via the pressure controller according to the value of the ratio.

In one or more embodiments, the method may include calculating steam demand via the digital computer according to the pressure and operational load and commanding the control system to reduce steam flow to the cogeneration unit based on the steam demand. The method may also include maintaining production from the natural gas liquids fractionation facility in a preset target production range.

In one or more embodiments, the method may include withdrawing a first petroleum fraction stream from a first of the plurality of distillation columns and feeding the first petroleum fraction product stream from the first distillation column to a second of the plurality of distillation columns. The method may also include withdrawing a second petroleum fraction stream from the second distillation column and feeding the second petroleum fraction product stream from the second distillation column to a third of the plurality of distillation columns. The method may also include withdrawing a third hydrocarbons fraction product stream from a third of the plurality of distillation columns.

In one or more embodiments, the method may include measuring a bottom temperature of the cogeneration unit via a temperature sensor and transmitting a third signal for temperature measurement to the digital computer. The method may also include establishing a fourth signal based on the bottom temperature. The control system may be configured to receive the fourth signal and control a temperature controller.

In one or more embodiments, the method may further include measuring a bottom temperature of the cogeneration unit via a temperature sensor, transmitting a third signal for temperature measurement to the digital computer, and establishing a fourth signal based on the bottom temperature, wherein the control system is configured to receive the fourth signal and control a temperature controller.

In one or more embodiments, the method may include decreasing column pressure in case when the cogeneration unit is fully loaded in order to conserve fuel from boilers; where fully loaded is when the cogeneration unit is producing power and steam at its maximum design. In other embodiments, the method may include increasing column pressure in case when the cogeneration unit is partially loaded in order to increase power production from cogeneration units.

Figure 3:
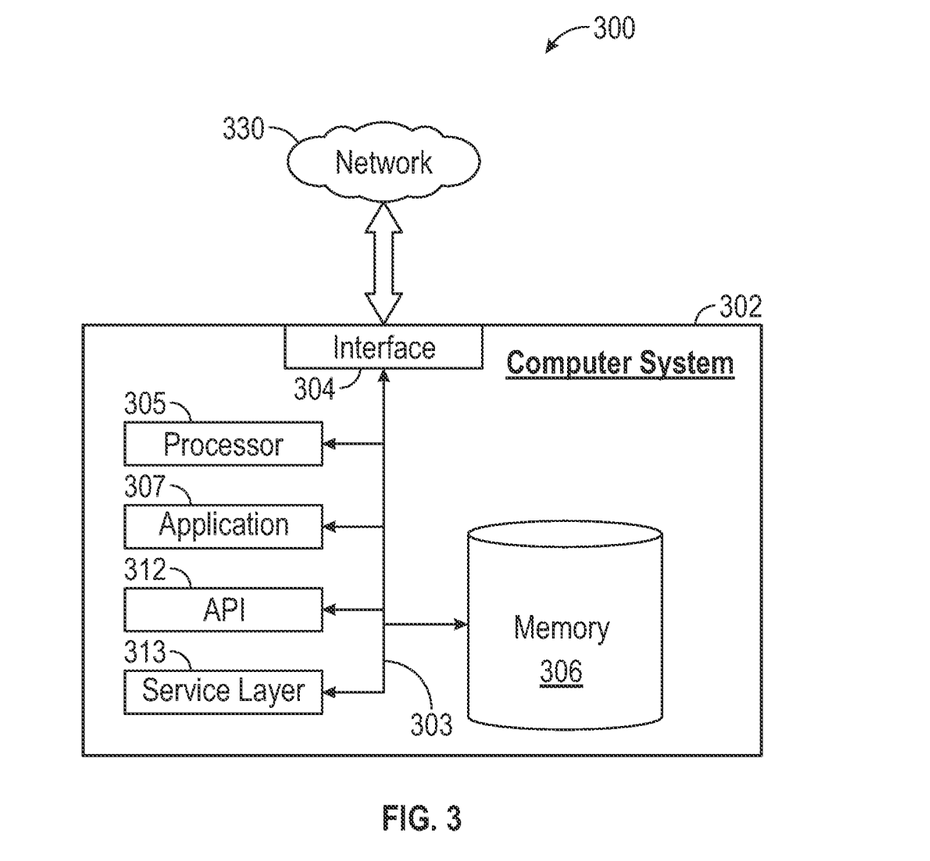
FIG. 3 shows a computer system, in accordance with one or more embodiments.

FIG. 3 shows a system 300 in accordance with one or more embodiments. The computer system 302 is used to provide computational functionalities associated with described algorithms, methods, functions, processes, flows, and procedures as described in the present disclosure, according to one or more embodiments. The computer system 302 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer system 302 may include a computer that includes an input device, such as a keypad, keyboard, touch screen, or other device that can accept user information, and an output device that conveys information associated with the operation of the computer system 302, including digital data, visual, or audio information (or a combination of information), or a graphical user interface (GUI). The computer system 302 utilizes a distributed control system with dedicated CPUs to run control calculations in buildings near their respective controlled areas. This enables zoning of systems to avoid loss of multiple processing areas simultaneously and facilitates finding the failure when it occurs.

The computer system 302 can serve in a role as a client, network component, a server, a database or other persistency, or any other component (or a combination of roles) of a computer system for performing the subject matter described in the instant disclosure. The computer system 302 is communicably coupled with a network 330. In some implementations, one or more components of the computer system 302 may be configured to operate within environments, including cloud-computing-based, local, global, or other environments (or a combination of environments).

At a high level, the computer system 302 is an electronic computing device operable to receive, transmit, process, store, or manage data and information associated with the described subject matter. According to some implementations, the computer system 302 may also include or be communicably coupled with an application server, e-mail server, web server, caching server, streaming data server, business intelligence (BI) server, or other server (or a combination of servers).

The computer system 302 can receive requests over the network (330) from a client application, for example, executing on another computer system (not shown) and responding to the received requests by processing the said requests in an appropriate software application. For example, the computer system 302 may receive requests over a network 330 from another computer system (not shown) and respond to the received requests appropriately. In addition, requests may also be sent to the computer system 302 from internal users (for example, from a command console or by other appropriate access method), external or third-parties, other automated applications, as well as any other appropriate entities, individuals, systems, or computers.

The computer system 302 includes an interface 304. Although interface 304 is illustrated as a single interface in FIG. 3, two or more interfaces may be used according to particular needs, desires, or particular implementations of the computer system 302. The interface 304 is used by the computer system 302 for communicating with other systems in a distributed environment that is connected to the network (330). Generally, the interface 304 includes logic encoded in software or hardware (or a combination of software and hardware) and is operable to communicate with the network (330). More specifically, the interface 304 may include software supporting one or more communication protocols associated with communications such that the network (330) or interface's hardware is operable to communicate physical signals within and outside of the computer system 302.

The computer system 302 also includes a computer processor 305. Although computer processor 305 is illustrated as a single computer processor in FIG. 3, two or more processors may be used according to particular needs, desires, or particular implementations of the computer system 302. Generally, the computer processor 305 executes instructions and manipulates data to perform the operations of the computer system 302 and any algorithms, methods, functions, processes, flows, and procedures as described in the instant disclosure.

The computer system 302 further includes a memory 306 that holds data for the computer system 302 or other components (or a combination of both) that can be connected to the network (330). For example, memory 306 can be a database storing data consistent with this disclosure. Although memory 306 is illustrated as a single memory in FIG. 3, two or more memories may be used according to particular needs, desires, or particular implementations of the computer system 302 and the described functionality. While memory 306 is illustrated as an integral component of the computer system 302, in alternative implementations, memory 306 can be external to the computer system 302.

The computer system 302 further includes an application 307. The application 307 is an algorithmic software engine providing functionality according to particular needs, desires, or particular implementations of the computer system 302, particularly with respect to functionality described in this disclosure. For example, application 307 can serve as one or more components, modules, applications, etc. Further, although application 307 is illustrated as a single application, the application 307 may be implemented as multiple applications on the computer system 302. In addition, although illustrated as integral to the computer system 302, in alternative implementations, the application 307 can be external to the computer system 302.

Each of the components of the computer system 302 can communicate using a system bus 303. In some implementations, any or all of the components of the computer system 302, both hardware or software (or a combination of hardware and software), may interface with each other or the interface 304 (or a combination of both) over the system bus 303 using an application programming interface 312 or a service layer 313 or a combination of the application programming interface 312 and service layer 313. The application programming interface 312 may include specifications for routines, data structures, and object classes. The application programming interface 312 may be either computer-language independent or dependent and refer to a complete interface, a single function, or even a set of application programming interfaces.

The service layer 313 provides software services to the computer system 302 or other components (whether illustrated or not) that are communicably coupled to the computer system 302. The functionality of the computer system 302 may be accessible to all service consumers using this service layer. Software services, such as those provided by the service layer 313, provide reusable, defined business functionalities through a defined interface. For example, the interface may be software written in JAVA, C++, or other suitable language providing data in extensible markup language (XML) format or another suitable format. While illustrated as an integrated component of the computer system 302, alternative implementations may illustrate the application programming interface 312 or the service layer 313 as stand-alone components in relation to other components of the computer system 302 or other components (whether or not illustrated) that are communicably coupled to the computer system 302. Moreover, any or all parts of the application programming interface 312 or the service layer 313 may be implemented as child or sub-modules of another software module, enterprise application, or hardware module without departing from the scope of this disclosure.

In one or more embodiments, the present system and method relate to operating industrial facilities, for example, a natural gas liquid fractionation plant or other industrial facilities that include operating plants that both generate energy, in the form of heat and power, for example, by a cogeneration unit and use the energy for example for distillation. More specifically, embodiments of the present disclosure relate to a system and a method for controlling energy generation and use in natural gas liquids (NGL) fractionation facilities and processes.

Gas processing plants can purify raw natural gas or crude oil production-associated gases (or both) by removing common contaminants such as water, carbon dioxide, and hydrogen sulfide. Some of the substances which contaminate natural gas have economic value and can be processed or sold or both. Upon the separation of methane gas, which is useful as sales gas for houses and power generation, the remaining hydrocarbon mixture in the liquid phase is called natural gas liquids (NGL). The NGL is fractionated in a separate plant or sometimes in the same gas processing plant into ethane, propane, and heavier hydrocarbons for several versatile uses in chemical and petrochemical as well as transportation industries.

The NGL fractionation plant uses the following processes or sections: fractionation, product treating, and natural gasoline processing. The fractionation processes or sections can include one or more of a propane condenser, a propane refrigerant condenser, a naphtha cooler, a depentanizer condenser, an amine-di-iso-propanol (ADIP) cooler, a regenerator overhead (OVHD) condenser, a Reid vapor pressure (RVP) column condenser, a depropanizer condenser, a debutanizer condenser, or combinations thereof. The product treating processes or sections can include one or more of a propane dehydrator condenser, a butane dehydrator condenser, a propane condenser, an air-cooled condenser, a regeneration gas cooler, and a butane condenser, or combinations thereof. The natural gasoline processing processes or sections can include but are not limited to, natural gasoline (NG) flash vapor condenser, an NG decolorizer condenser, or combinations thereof. The NGL fractionation plant may include a plurality of distillation units. Each distillation unit may produce a different bottom hydrocarbon fraction and/or a different top hydrocarbon fraction from another of the distillation units. Each distillation unit may be a for example, a deethanizer, a depropanizer, or a debutanizer.

Fractionation is the process of separating the different components of natural gas. Separation is possible because each component has a different boiling point. At temperatures less than the boiling point of a particular component, that component condenses to a liquid. It is also possible to increase the boiling point of a component by increasing the pressure. By using columns operating at different pressures and temperatures, the NGL fractionation plant is capable of separating ethane, propane, butane, pentane, or combinations thereof (with or without heavier associated hydrocarbons) from NGL fractionation feeds. Deethanizing separates ethane from C2+ NGL, where C2 refers to a molecule containing two carbon atoms (ethane), and where C2+ refers to a mixture containing molecules having two or more carbon atoms, for example, an NGL containing C2, C3, C4, C5 can be abbreviated as "C2+ NGL." Depropanizing and debutanizing separate propane and butane, respectively, from C3+ NGL and C4+ NGL, respectively. Because the boiling points of heavier natural gases are closer to each other, such gases can be harder to separate compared to lighter natural gases. Also, the rate of separation of heavier components is less than that of comparatively lighter components. In some instances, the NGL fractionation plant can implement, for example, about 45 distillation trays in the deethanizer, about 50 trays in the depropanizer, and about 55 trays in the debutanizer.

The fractionation section can receive a feed gas containing C2+ NGL from gas plants, which are upstream plants that condition and sweeten the feed gas, and produce a sales gas, such as a C1/C2 mixture, where C1 is about 90%, as a final product. The C2+ NGL from gas plants can be further processed in the NGL fractionation plant for C2+ recovery. From feed metering or surge unit metering (or both), feed flows to the three fractionation modules, namely, the deethanizing module, the depropanizing module, and the debutanizing module, each of which is described later.

The C2+ NGL is pre-heated before entering the deethanizer column for fractionation. The separated ethane leaves the column as overhead gas. The ethane gas is condensed by a closed-loop propane refrigeration system. After being cooled and condensed, the ethane is a mixture of gas and liquid. The liquid ethane is separated and pumped back to the top of the column as reflux. The ethane gas is warmed in an economizer and then extracted for use. The bottom product from the deethanizer reboiler is C3+ NGL, which is sent to the depropanizer module.

From the deethanizer module, C3+ NGL enters the depropanizer module for fractionation. The separated propane leaves the column as overhead gas. The gas is condensed using coolers. The propane condensate is collected in a reflux drum. Some of the liquid propane is pumped back to the column as reflux. The rest of the propane is either treated or sent to users as an untreated product. The bottoms product from the depropanizer reboiler, C4+ is then sent to the debutanizer module C4+ enters the debutanizer module for fractionation. The separated butane leaves the column as overhead gas. The gas is condensed using coolers. The butane condensate is collected in a reflux drum. Some of the liquid butane is pumped back to the column as reflux. The rest of the butane is either treated or sent to users as an untreated product. The bottoms product from the debutanizer reboiler, C5+ natural gas (NG) goes on to an RVP control section (which may also be referred to as a rerun unit), which will be discussed in greater detail in a later section.

While ethane requires no further treatment, propane and butane products are normally treated to remove hydrogen sulfide ($H_2S$), carbonyl sulfide (COS), and mercaptan sulfur (RSH). Then, the products are dried to remove any water. All exported product is treated, while untreated products can go to other industries.

In general, heat exchangers or reboilers are used to transfer heat from one medium (for example, a stream flowing through a plant in an NGL fractionation plant, a buffer fluid or other medium) to another medium (for example, a buffer fluid or different stream flowing through a plant in the NGL fractionation plant). In the configurations described in this disclosure, reboilers are used to transfer heat from the cogeneration units to the distillation columns.

Heat exchangers are devices that transfer (exchange) heat typically from a hotter fluid stream to a relatively less hot fluid stream. Heat exchangers can be used in heating and cooling applications, for example, in refrigerators, air conditions, or such cooling applications. Heat exchangers can be distinguished from one another based on the direction in which fluids flow. For example, heat exchangers can be parallel-flow, cross-flow or counter-current. In parallel-flow heat exchangers, both fluids involved move in the same direction, entering and exiting the heat exchanger side-by-side. In cross-flow heat exchangers, the fluid path runs perpendicular to one another. In counter-current heat exchangers, the fluid paths flow in opposite directions, with one fluid exiting and the other fluid enters. Counter-current heat exchangers are sometimes more effective than other types of heat exchangers.

In addition to classifying heat exchangers based on fluid direction, heat exchangers can also be classified based on their construction. Some heat exchangers are constructed of multiple tubes. Some heat exchangers include plates with room for fluid to flow in between. Some heat exchangers enable heat exchange from liquid to liquid, while some heat exchangers enable heat exchange using other media.

Heat exchangers or reboilers in an NGL fractionation plant are often shell and tube type heat exchangers which include multiple tubes through which fluid flows. The tubes are divided into two sets—the first set contains the fluid to be heated or cooled; the second set contains the fluid responsible for triggering the heat exchange, in other words, the fluid that either removes heat from the first set of tubes by absorbing and transmitting the heat away or warms the first set by transmitting its own heat to the fluid inside. When designing this type of exchanger, care must be taken in determining the correct tube wall thickness as well as tube diameter, to allow optimum heat exchange. In terms of flow, shell and tube heat exchangers can assume any of three flow path patterns.

Heat exchangers or reboilers in NGL facilities can also be plate and frame-type, heat exchangers. Plate heat exchangers include thin plates joined together with a small amount of space in between, often maintained by a rubber gasket. The surface area is large, and the corners of each rectangular plate feature an opening through which fluid can flow between plates, extracting heat from the plates as it flows. The fluid channels themselves alternate hot and cold liquids, meaning that the heat exchangers can effectively cool as well as heat fluid. Because plate heat exchangers have a large surface area, they can sometimes be more effective than shell and tube heat exchangers.

Heat exchangers or reboilers in NGL facilities can also be kettle-type reboilers. A kettle-type reboiler is designed to allow a heating fluid to pass through tubes that are covered in the fluid that are to be distilled. As the liquid heats up and boils, it is sent to the distillation column and condensed by cooling liquid.

Other types of heat exchangers can include regenerative heat exchangers and adiabatic wheel heat exchangers. In a regenerative heat exchanger, the same fluid is passed along both sides of the exchanger, which can be either a plate heat exchanger or a shell and tube heat exchanger. Because the fluid can get very hot, the exiting fluid is used to warm the incoming fluid, maintaining a near-constant temperature. Energy is saved in a regenerative heat exchanger because the process is cyclical, with almost all relative heat being transferred from the exiting fluid to the incoming fluid. To maintain a constant temperature, a small quantity of extra energy is needed to raise and lower the overall fluid temperature. In the adiabatic wheel heat exchanger, an intermediate liquid is used to store heat, which is then transferred to the opposite side of the heat exchanger. An adiabatic wheel consists of a large wheel with threads that rotate through the liquids—both hot and cold—to extract or transfer heat. The heat exchangers described in this disclosure can include any one of the heat exchangers described earlier, other heat exchangers, or combinations of them.

Each heat exchanger in each configuration can be associated with a respective thermal duty (or heat duty). The thermal duty of a heat exchanger can be defined as an amount of heat that can be transferred by the heat exchanger from the hot stream to the cold stream. The amount of heat can be calculated from the conditions and thermal properties of both the hot and cold streams. From the hot stream point of view, the thermal duty of the heat exchanger is the product of the hot stream flow rate, the hot stream specific heat, and a difference in temperature between the hot stream inlet temperature to the heat exchanger and the hot stream outlet temperature from the heat exchanger. From the cold stream point of view, the thermal duty of the heat exchanger is the product of the cold stream flow rate, the cold stream specific heat, and a difference in temperature between the cold stream outlet from the heat exchanger and the cold stream inlet temperature from the heat exchanger. In several applications, the two quantities can be considered equal assuming no heat loss to the environment for these units, particularly, where the units are well insulated. The thermal duty of a heat exchanger can be measured in watts (W), megawatts (MW), millions of British Thermal Units per hour (Btu/hr.), or millions of kilocalories per hour (Kcal/h). In the configurations described here, the thermal duties of the heat exchangers are provided as being "about X MW," where "X" represents a numerical thermal duty value. The numerical thermal duty value is not absolute. That is, the actual thermal duty of a heat exchanger can be approximately equal to X, greater than X, or less than X.

EXAMPLE

The objective of this simulation study was to maximize power generation and/or minimize fuel consumption in order to reduce the overall energy intensity of the gas plant. Distillation columns are known to be one of the most energy intensive equipment at industrial facilities. Therefore, the experimental simulation targeted optimizing NGL fractionation column operations.

NGL fractionation train utilizes primly high-pressure steam generated from boilers and cogeneration units at the gas plant utility area. The NGL fractionation train is a major steam consumer. Therefore, the objective of this study was to evaluate different modes of operations at the distillation columns and quantify their impact on the steam and power generation systems at the gas plant to be optimized.

The impact of manipulating the process parameters at the gas plant's NGL fractionation columns on the required steam demand was assessed utilizing process simulation software (UniSim) based on C2+ feed composition.

Process simulation software (UniSim) was used for this study. An Operator Training Solution (OTS) model was the starting point to build the simulation cases. A series of scenarios were developed by modifying operating conditions to identify the possibility of increasing or decreasing the steam consumption at the columns while maintaining the quality of the products within the margins stipulated in Saudi Aramco Product Specification Sheets.

Several cases were evaluated in order to determine the optimal mode of operation throughout the year as summarized in the following table:

| No. | Description | Impact | Applicability |
|---|---|---|---|
| Case 1 | Decrease of column pressure and maintain product purities | Decrease of steam demand resulting in the reduction of fuel gas in boilers | When cogeneration units are fully loaded |
| Case 2 | Increase column pressure and maintain product purities | Increase of steam demand resulting in maximization of power generation in cogeneration units | When cogeneration units are not fully loaded |

In order to conduct the study, several conditions, constraints, and costs were set and utilized thorough the study as per the following:

The simulation included a gas plant equipped with four cogeneration units and three boilers. The four cogeneration units were designed as producing ethane, propane, butane, and natural gas.

Each column included two kettle-type reboilers that control the specification of the bottoms leaving each distillation column. The boilers were configured to supply the required amount of steam to heat the overall gas plant. The simulation model also included necessary connections to the reboilers of the columns. Process equipment included columns, condensers, reboilers, turbines, and pipelines.

Medium pressure steam is utilized as a heating medium for those reboilers. The medium pressure steam was at 150 PSIG. In addition, the train is equipped with a two-stage propane compressor driven by a high-pressure steam turbine. The exhaust of the turbine is medium pressure steam that is consumed in the reboilers. The deficit of the steam required in the reboilers is supplied through a steam letdown station that produces medium pressure steam from high-pressure steam.

Additionally, another key part of the simulation that was implemented is the propane refrigeration loop. The two-stage compressor (Q69-K-101) was modeled and linked with the steam turbine (Q69-KT-101, which calculates the necessary HP Steam flow rate based on the power consumption of the compressor Q69-K-101).

The C2+ composition used for the study is provided below in the table. A flow rate of 222 MBD was utilized as a basis for the simulation and steam calculations.

TABLE 1

Composition of C2 + Feed

| Component | % Mole |
|---|---|
| $H_2O$ | 0.00% |
| Nitrogen | 0.00% |
| $CO_2$ | 0.00% |
| $H_2S$ | 0.01% |
| Methane | 0.40% |
| Ethane | 33.98% |
| Propane | 35.78% |
| i-Butane | 4.37% |
| n-Butane | 14.24% |
| i-Pentane | 3.97% |
| n-Pentane | 5.64% |
| n-Hexane | 0.91% |
| n-Heptane | 0.39% |
| n-Octane | 0.11% |
| n-Nonane | 0.04% |
| n-Decane | 0.01% |
| M-Mercaptan | 0.04% |
| E-Mercaptan | 0.11% |
| Total | 100.00% |
| Flowrate [bbl/day] | 222000 |

Maximum and minimum operating pressures were set in order to ensure the integrity of the system. The pressure was set such that there will always be 10% margin from the relief valve setting in the column. In addition, the reflux rate was set at maximum such that the column may not be flooded.

Combined heat and power (CHP) model was used to calculate the cogeneration power and fuel gas increment as a result of the optimization.

The below table illustrates the base case conditions or parameters for each column and turbine. For calculation, base case conditions, or parameters for each fractionation column and turbine were assumed as the following:

Total steam consumption in the reboilers=786,574 lb/hr; and

Total steam consumption in the turbine=430,201 lb/hr.

TABLE 2

Base Case Columns Process Parameters

| | DeC2 | DeC3 | DeC4 | Decol |
|---|---|---|---|---|
| Condenser Temp [F.] | 41 | 141 | 140 | 129 |
| Top tray Temp [F.] | 44 | 144 | 149 | 175 |
| Bottom tray Temp [F.] | 202 | 266 | 234 | 313 |
| Reboiler Temp [F.] | 217 | 275 | 239 | 350 |
| Condenser Pressure [psia] | 393 | 309 | 100 | 26 |
| Top tray Pressure [psia] | 403 | 319 | 110 | 36 |
| Bottom Pressure [psia] | 408 | 324 | 115 | 37 |
| Reboiler Press [psia] | 408 | 324 | 115 | 37 |
| Reflux Ratio | 2.9 | 3 | 3.1 | 0.04 |
| Steam flowrate [lb/hr] | 275,633 | 285,281 | 189,205 | 364,55 |

TABLE 3

| Base Case Turbine Q69-KT-101 working conditions | |
|---|---|
| Feed Pressure [psia] | 639.7 |
| Product Pressure [psia] | 159.7 |
| Product Temperature [F.] | 462 |
| Power [HP] | 211,10 |
| HP Steam Flowrate [lb/hr] | 430,201 |

Based on the test trials, two optimum operating conditions were determined, and are discussed below. The first optimum operating condition (Case 1) was for determining maximizing steam usage that increases power production from the cogeneration unit during low steam demand periods. Therefore, Case 1 is suitable for increasing the annual profit. Case 1 refers to the situation when cogeneration units are fully loaded, usually for 3 months per year. Under case 1, steam demand is decreased, therefore, resulting in a reduction of required fuel gas amount in boilers.

Case 1: Decreasing Columns Operating Pressure

In order to study the impact of decreasing the column pressure, the pressure was decreased in the system by 10% of the original set point. The product recoveries and purities were maintained similar to the base case. The steam demand was reduced by 54,838.46 lb/hr.

TABLE 4

| Case 1 Columns Process Parameters | | | | |
|---|---|---|---|---|
| | DeC2 | DeC3 | DeC4 | Decol |
| Condenser Temp [F.] | 32.4 | 131.3 | 131.7 | 119 |
| Top tray Temp [F.] | 35.9 | 134.9 | 140.9 | 167.6 |
| Bottom tray Temp [F.] | 190.1 | 254.0 | 225.0 | 307.6 |
| Reboiler Temp [F.] | 205.2 | 264.0 | 230.3 | 342.9 |
| Condenser Pressure [psia] | 352 | 277 | 89 | 22 |
| Top tray Pressure [psia] | 362 | 287 | 99 | 32 |
| Bottom Pressure [psia] | 367 | 292 | 104 | 33 |
| Reboiler Press [psia] | 367 | 292 | 104 | 33 |
| Reflux Ratio | 2.5 | 2.51 | 2.74 | 0.04 |
| Steam flowrate [lb/hr] | 251,040.25 | 266,983.89 | 175,667.83 | 380,43.57 |

TABLE 5

| Case 1 Turbine Q69-KT-101 working conditions | |
|---|---|
| Feed Pressure [psia] | 639.7 |
| Product Pressure [psia] | 159.7 |
| Product Temperature [F.] | 462 |
| Power [HP] | 19370 |
| HP Steam Flowrate [lb/hr] | 394,651 |

In this case, the cogeneration units will be at their maximum load for 3 months and the pressure of the column will be reduced to decrease the steam demand. This will result in reducing the running boilers MCR and hence reduce the fuel gas consumption.

From the simulation model the steam demand will be reduced by 54,838.46 lb/hr. From CHB model: 1.8 MMSCFD of fuel gas will be reduced due to reducing Boiler load.

In order to study the impact of decreasing the column pressure, the pressure was decreased in the system by 10% of the original set point. The product recoveries and purities were maintained similarly to the base case. The steam demand was reduced by 7%.

Compared to the base case, the flow rates of the steam to the columns decreased due to the decrease in pressure, also the steam turbine will be required to produce less power due to a decrease of required cooling duty from the propane refrigeration loop.

Case 2: Increasing Columns Operating Pressure

In order to study the impact of increasing the column pressure, the pressure was increased in the system up to a point where enough margin is kept between the operating and maximum design conditions. The product recoveries and purities were maintained similarly to the base case. The steam demand was increased by 36,364.40 lb/hr.

TABLE 6

| Case 2 Columns Process Parameters | | | | |
|---|---|---|---|---|
| | DeC2 | DeC3 | DeC4 | Decol |
| Condenser Temp [F.] | 42 | 142.1 | 147.5 | 170.8 |
| Top tray Temp [F.] | 45.2 | 145.5 | 155.5 | 206.7 |
| Bottom tray Temp [F.] | 203.8 | 267.6 | 240.9 | 337.9 |
| Reboiler Temp [F.] | 219 | 277.5 | 246 | 380.5 |
| Condenser Pressure [psia] | 400 | 315 | 110 | 48.7 |
| Top tray Pressure [psia] | 410 | 325 | 120 | 58.7 |
| Bottom Pressure [psia] | 415 | 330 | 125 | 59.7 |
| Reboiler Press [psia] | 415 | 330 | 125 | 59.7 |
| Reflux Ratio | 3 | 3.2 | 3.4 | 0.04 |
| Steam flowrate [lb/hr] | 280,394.34 | 298,930.01 | 204,167.35 | 394,46.70 |

TABLE 7

| Case 2 Turbine Q69-KT-101 Working Conditions | |
|---|---|
| Feed Pressure [psia] | 639.7 |
| Product Pressure [psia] | 159.7 |
| Product Temperature [F.] | 462 |
| Power [HP] | 22280 |
| HP Steam Flowrate [lb/hr] | 454035 |

Compared to the base, the steam flow rates are slightly higher due to the increase of the pressure for the columns, also the steam turbine will be required to produce more power due to an increase of required cooling duty from the propane refrigeration loop.

In Case 2, it was found that cogeneration unit load can be maximized for around 9 months according to 2018 & 2019 historical data. Therefore, it is recommended to increase the columns pressure in order to increase the steam demand to load the Cogens.

From the simulation model the steam demand will be increased by 36,364.40 lb/hr. From CHB Model: (i) 1.95 MMSFD of fuel gas demand will be increased due to the increase on Cogens load. (ii) Additional of 9.27 MW will be generated due to the increase in steam demand.

In order to study the impact of increasing the column pressure, the pressure was increased in the system up to a point where enough margin is kept between the operating and maximum design conditions. The product recoveries and purities were maintained similar to the base case. The steam demand increased by 5%.

Compared to the base, the steam flow rates are slightly higher due to the increase of the pressure for the columns, also the steam turbine will be required to produce more power due to an increase of required cooling duty from the propane refrigeration loop.

Summarizing Case 1 and Case 2

The below table summarizes the impact of each mode of operation on the plant steam and power systems compared with the base case.

A comparative result between Case 1 and Case 2 is shown below in Table 8.

TABLE 8

Comparison between Different Modes of Operations

| Case | Delta Steam Demand (lb/hr) | Delta Power (MW) | Delta Fuel Gas (MMSCFD) |
|---|---|---|---|
| Case 1 | Decrease by 54,838.46 | N.A. | Decrease by 1.8 |
| Case 2 | Increase by 36,364.40 | Increase by 9.27 | Increase by 1.95 |

As shown in the above table, the steam consumption was proportional to the column operating pressures. Therefore, in order to reduce steam consumption or reduce energy consumption at the reboiler, the column pressure may be reduced in cases when all cogeneration units are fully loaded.

In contrast, increasing the column pressures (case 2) increased power production from cogeneration units in case they were not fully loaded. The power production may further be increased by coupling the increase of column pressures and manipulation of purity or composition of the product.

Conventional plant design considers that all cogeneration units would be fully loaded while high-pressure boilers are operated at a minimum load. However, due to the following factors, the plant might encounter several operating scenarios where the cogeneration units are not fully utilized, or high-pressure boilers are loaded at above their lower Maximum Continuous Rating (MCR). As used herein, MCR refers to the capability of steam boiler to produce and provide the stated quantity of steam continually and easily with not all kinds of deficit or unwanted effects upon the principal steam boiler and its components. Such unwanted effects may include but are not limited to overloading, slagging, and overheating.

With normal operational conditions, a plant may encounter the following scenarios:

Scenario 1: Design steam requirements are considered for all process units in the steam balance. Actual operating requirements are lower, particularly during underutilization of the facility as well as during optimized operation.

Scenario 2: Summer temperatures show air cooler performance limitations. An example of this is gas-treating processes requiring reduced steam: solvent ratios. As used herein, "gas treating" refers to a gas conditioning treatment that uses amine solutions to absorb unwanted acid gases such as hydrogen sulfide and carbon dioxide. The air cooler performance limitation during summer months i.e.; high-temperature environment reduces the plant's low-pressure steam demand.

Scenario 3: Operating at less than design sour gas feed rates due to sales gas demand limitations. Underutilization of gas treatment leads to reduced steam demand, which limits the loading of the cogeneration units.

Embodiments of the present disclosure may provide at least one of the following advantages. The disclosed system and method introduce an optimization step that may overcome the limitations described in the above three scenarios. The disclosed system may overcome challenges associated with the fluctuating steam demand in cogeneration units. The disclosed system and method can manipulate the fractionation column's process parameters such as the fractionation column's pressure, bottom temperature (that is preferably pressure compensated, and is used to control the input of heat to the reboiler), and reflux ratio to maximize or minimize the heating duty of the reboiler based on a load of steam and power producers. As disclosed, the impact of manipulating the process parameters in natural gas liquids (NGL) fractionation columns on the required steam demand may be assessed utilizing process simulation software based on actual C2+ composition. Several compositions and process parameters may be manipulated, therefore, may be evaluated to mimic real plant operations prior to practical applications in order to determine the optimal mode of operation throughout the year.

According to some embodiments, it may be possible to achieve rapid optimization by utilizing similar operational characteristics for wells determined to be similar to previously optimized wells, such as wells in the same formation, wells with similar fluid properties, and wells with similar pressures and temperature, etc. Additionally, the described process may be carried out at desired intervals for each well in a field of wells. For example, the process may be performed on a predetermined basis, such as daily, weekly, monthly, yearly, etc., and/or following a triggering event, such as, for example, receiving new well test data (e.g., new well rate.)

"Optionally" means that the subsequently described event or circumstances may or may not occur. The description includes instances where the event or circumstance occurs and instances where it does not occur.

When the word "approximately" or "about" is used, this term may mean that there can be a variance in the value of up to +10%, of up to 5%, up to 2%, or up to 1%, of up to 0.5%, of up to 0.1%, or up to 0.01%.

Ranges may be expressed as from about one particular value to about another particular value, inclusive. When such a range is expressed, it should be understood that another one or more embodiments are from one particular value to the other particular value, along with all particular values and combinations thereof within the range.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

While several illustrative embodiments have been described in detail above, those skilled in the art will readily appreciate that many modifications are possible in the example embodiments without materially departing from the scope of the present disclosure. Accordingly, all such modifications are intended to be included within the scope of this disclosure as defined in the following claims.

What is claimed:

1. A process for distillation, the process comprising:
   distilling a hydrocarbon feed to produce a top hydrocarbon fraction and a bottom hydrocarbon fraction in a column within a distillation unit comprising the column, a reboiler, and a control system;
   feeding steam from a cogeneration unit to the reboiler at a steam demand maintained by the control system; and
   controlling power generated by the cogeneration unit with a power controller within the control system, wherein controlling the power comprises decreasing or increasing a column pressure of the cogeneration unit via a pressure controller according to a ratio of an operational load to a pre-set maximum allowable load.

2. The process of claim 1, comprising measuring a bottom temperature of the column via a temperature sensor.

3. The process of claim 2, comprising controlling the bottom temperature via a temperature controller within the control system.

4. The process of claim 1, comprising measuring a column pressure via a pressure sensor.

5. The process of claim 1, wherein maintaining the steam demand comprises controlling the column pressure.

6. The process of claim 1, comprising decreasing the column pressure when the cogeneration unit is fully loaded.

7. The process of claim 1, comprising increasing the column pressure when the cogeneration unit is not fully loaded.

8. The process of claim 1, wherein the hydrocarbon feed comprises natural gas.

9. The process of claim 1, wherein the hydrocarbon feed comprises C1-C8 hydrocarbons.

10. The process of claim 1, wherein the distillation unit and the cogeneration unit are each part of a natural gas liquids fractionation facility.

11. The process of claim 10, wherein the distillation unit is a deethanizer, a depropanizer, or a debutanizer.

12. A system for distillation, the system comprising:
    a distillation unit comprising a column, a reboiler, and a control system, wherein the distillation unit is configured to distill a hydrocarbon feed to produce a top hydrocarbon fraction and a bottom hydrocarbon fraction;
    a cogeneration unit configured to feed steam to the distillation unit; and
    a pressure controller,
    wherein the control system is configured to control a power generated by the cogeneration unit and to maintain a steam demand from the cogeneration unit via the pressure controller according to a ratio of an operational load to a pre-set maximum allowable load.

13. The system of claim 12, wherein the control system comprises a power controller.

14. The system of claim 12, wherein the reboiler is a kettle-type reboiler.

15. The system of claim 12, wherein the distillation unit is a deethanizer, a depropanizer, or a debutanizer.

16. The system of claim 12, wherein the distillation unit is selected from a plurality of distillation units in a natural gas liquids fractionation facility.

17. The system of claim 12, wherein the cogeneration unit is selected from a plurality of cogeneration units in a natural gas liquids fractionation facility.

* * * * *